US008984241B2

(12) United States Patent
Aizman

(10) Patent No.: US 8,984,241 B2
(45) Date of Patent: Mar. 17, 2015

(54) HETEROGENEOUS REDUNDANT STORAGE ARRAY

(75) Inventor: Alexander Aizman, Mountain View, CA (US)

(73) Assignee: Nexenta Systems, Inc., Mountain View, CA (US)

( * ) Notice: Subject to any disclaimer, the term of this patent is extended or adjusted under 35 U.S.C. 154(b) by 178 days.

(21) Appl. No.: 12/875,073

(22) Filed: Sep. 2, 2010

(65) Prior Publication Data

US 2012/0011337 A1    Jan. 12, 2012

Related U.S. Application Data

(60) Provisional application No. 61/365,153, filed on Jul. 16, 2010, provisional application No. 61/362,260, filed on Jul. 7, 2010.

(51) Int. Cl.
| | |
|---|---|
| G06F 12/00 | (2006.01) |
| G06F 13/00 | (2006.01) |
| G06F 13/28 | (2006.01) |
| G06F 11/10 | (2006.01) |
| G06F 3/06 | (2006.01) |

(52) U.S. Cl.
CPC .......... *G06F 11/1076* (2013.01); *G06F 3/0685* (2013.01); *G06F 2211/1028* (2013.01); *G06F 2211/103* (2013.01)
USPC .......................................... 711/162; 711/114

(58) Field of Classification Search
CPC ......... G06F 3/0685; G06F 3/065; G06F 7/00; G06F 2211/103; G06F 2211/1028; G06F 11/3048; G06F 11/1076
USPC ............................................................ 711/162
See application file for complete search history.

(56) References Cited

U.S. PATENT DOCUMENTS

| | | | |
|---|---|---|---|
| 5,430,855 A | 7/1995 | Walsh et al. | |
| 5,696,934 A * | 12/1997 | Jacobson et al. | ............. 714/5.11 |
| 6,223,206 B1 | 4/2001 | Dan et al. | |

(Continued)

OTHER PUBLICATIONS

Garrison et al., "Umbrella File System: Storage Management Across Heterogeneous Devices," ACM Trans. Stor. 5, 1, Article 3 (Mar. 2009).

(Continued)

*Primary Examiner* — Matthew Bradley
*Assistant Examiner* — Rocio Del Mar Perez-Velez
(74) *Attorney, Agent, or Firm* — Ropes & Gray LLP

(57) ABSTRACT

A method and system is disclosed for providing fault tolerant data storage with built-in backup capabilities, improved I/O performance, and improved utilization of storage devices. A method for writing data includes receiving request to write a logical block of data to a heterogeneous data volume comprising plurality of storage devices (disks), determining number of copies of the logical block to store and associated classes of disks within the data volume to be used with each copy, processing each copy of the logical block in accordance with properties associated with the corresponding classes of disks within the data volume, determining replication schemes used in the data volume and associated with the specified classes of disks, segmenting the logical block into data blocks and generating additional parity blocks in accordance with the replication schemes, selecting data writing mechanisms in accordance with the classes of disks and using those mechanisms to write the data and parity blocks to the data volume.

21 Claims, 9 Drawing Sheets

(56) References Cited

U.S. PATENT DOCUMENTS

| | | | |
|---|---|---|---|
| 6,311,251 B1 | 10/2001 | Merritt et al. | |
| 6,330,621 B1 | 12/2001 | Bakke et al. | |
| 6,487,636 B1 | 11/2002 | Dolphin et al. | |
| 6,832,289 B2 | 12/2004 | Johnson | |
| 7,054,927 B2 | 5/2006 | Ulrich et al. | |
| 7,113,984 B1 | 9/2006 | Wallace et al. | |
| 7,149,846 B2 | 12/2006 | Hetrick | |
| 7,293,133 B1 | 11/2007 | Colgrove et al. | |
| 7,340,490 B2 | 3/2008 | Teloh et al. | |
| 7,454,446 B2 * | 11/2008 | Leung et al. | 1/1 |
| 7,464,222 B2 | 12/2008 | Matsunami et al. | |
| 7,594,024 B2 | 9/2009 | Shah et al. | |
| 7,725,444 B2 | 5/2010 | Devarakonda et al. | |
| 2001/0018728 A1 | 8/2001 | Topham et al. | |
| 2002/0138559 A1 | 9/2002 | Ulrich et al. | |
| 2004/0153606 A1 * | 8/2004 | Schott | 711/114 |
| 2005/0015461 A1 | 1/2005 | Richard et al. | |
| 2005/0216481 A1 | 9/2005 | Crowther et al. | |
| 2007/0022087 A1 * | 1/2007 | Bahar et al. | 707/1 |
| 2007/0033430 A1 * | 2/2007 | Itkis et al. | 714/6 |
| 2007/0288494 A1 | 12/2007 | Chrin et al. | |
| 2008/0034076 A1 | 2/2008 | Ishikawa et al. | |
| 2009/0094320 A1 | 4/2009 | Palthepu et al. | |
| 2009/0204758 A1 * | 8/2009 | Luning | 711/114 |
| 2009/0210431 A1 | 8/2009 | Marinkovic et al. | |
| 2009/0327603 A1 | 12/2009 | McKean et al. | |
| 2010/0070732 A1 | 3/2010 | Strutt | |
| 2010/0106683 A1 | 4/2010 | Nomoto et al. | |
| 2010/0149684 A1 * | 6/2010 | Kojima et al. | 360/77.04 |
| 2010/0281230 A1 | 11/2010 | Rabii et al. | |
| 2011/0040935 A1 * | 2/2011 | Murayama et al. | 711/114 |
| 2011/0246716 A1 | 10/2011 | Frame et al. | |

OTHER PUBLICATIONS

Hsu, W. W., et al., The Automatic Improvement of Locality in Storage Systems, ACM Transactions on Computer Systems, vol. 23, No. 4, pp. 424-473 (Nov. 2005).

Riedel, Erik, "Storage Systems No Just a Bunch of Disks Anymore," Queue, pp. 33-41 (Jun. 2003).

Extended European Search Report in EP Application No. EP14176942 dated Aug. 29, 2014.

* cited by examiner

HETEROGENEOUS REDUNDANT STORAGE ARRAY

CROSS-REFERENCE TO RELATED APPLICATION

This application is claiming under 35 USC 119(e), the benefit of provisional patent application Ser. No. 61/365,153, filed Jul. 16, 2010, and the benefit of provisional patent application Ser. No. 61/362,260, filed Jul. 7, 2010.

FIELD OF THE INVENTION

The present invention relates generally to storage systems, methods and architectures, and specifically to providing fault tolerant data storage with built-in backup capabilities and improved I/O performance.

BACKGROUND OF THE INVENTION

A traditional data volume combines multiple storage devices (disks) to provide for more capacity, data redundancy, and I/O bandwidth. Data stored on a data volume may be replicated using one or more replication schemes. Replication schemes are used to recover data in the event of system or network failures. For instance, a replication scheme known as redundant array of inexpensive disks RAID-1 creates an exact copy (or mirror) of data on two or more disks. N-way mirror includes N disks (where N>1) and maintains N identical copies of data, one copy per disk.

In many RAID schemes data to be stored is segmented into data blocks, and the resulting data blocks are then used to compute additional parity blocks, using for instance an XOR function. Both the data blocks and the parity block are then written (in stripes) to multiple disks within the RAID. For instance, RAID-6 replication scheme records two independent parity blocks per each stripe, in order to provide protection against double disk failure.

RAID based data replication ensures continuous availability and protection of data, in addition to better I/O performance that is associated with spreading I/O workload among multiple independent disks. Data volumes that combine multiple disks organized in RAID groups are therefore commonly deployed for all the aforementioned reasons. The corresponding solutions and products, with RAID implemented in the hardware/firmware of the RAID arrays or software of the operating systems (such as Linux or Solaris) are practically ubiquitous.

A typical data volume includes one or more RAID groups of disks. A data volume may also include spare disks, to support automated (hot-plug) replacement of failed disks in the volume. More recently, support for solid state drives (SSD) was added by vendors, to improve write and read performance of data volumes via optimized logging and caching.

FIG. 1 illustrates a typical data volume 10 with a single RAID-5 group 12 including in this embodiment 4 data disks. The data volume 10 also includes two spare disks 13. In general, the RAID-5 replication scheme works as follows. Each logical block submitted by application (for instance, by a filesystem) for writing is first segmented into data blocks. Assuming the RAID-5 group 12 includes 4 data disks, for each set of 3 data blocks an additional parity block would have to be generated. The 3 data blocks and the parity block in combination are a said to be a stripe. Logical blocks are then written to the data volume 10 in stripes, wherein each stripe spans the entire 4 disks and includes 3 data blocks and one parity block. For a RAID-5 group including N disks, each stripe would consist of (N−1) data blocks and one parity block.

In general, replication schemes used in the existing data volumes are subject to the following issues.

First and foremost, even when a substantial redundancy is configured in, the conventional replication schemes present no protection against simultaneous failure of multiple drives within the RAID or a RAID controller itself. For instance, the RAID-5 shown on the FIG. 1 will not be able to withstand a simultaneous failure of any 2 of the 4 disks.

Redundancy itself has a price associated with reduced total capacity of the data volume. For instance, the capacity of a RAID-1 including same-size N disks (N>=2) would be equal the capacity of a single disk.

Finally, the conventional replication schemes do not make any distinction between the data disks within the RAID groups, and distribute data blocks and parity blocks—in stripes—uniformly across the entire set of data disks. In that regard, recent advances in flash memory technology, for instance, introduce a number of new requirements. In particular, rapid advances in performance, reliability, and storage capacities for solid state drives (SSD) make it possible, and often desirable, to use SSDs within the data volumes.

SSDs, in comparison with the traditional hard drives, provide a number of advantages including better random access performance (SSDs eliminate seek time), silent operation (no moving parts), and better power consumption characteristics. On the other hand, SSDs are more expensive and have limited lifetimes, in terms of maximum number of program-erase (P/E) cycles.

The pros and cons associated with the flash memory technology, in combination with the strict existing requirements on data availability and fault tolerance, can therefore be translated as a requirement to provide for a new type of a data volume: a heterogeneous data volume that includes different classes of data disks and supports non-uniform data striping.

Existing RAIDs do not differentiate between data disks as far as data read and write operations are concerned. It can therefore be said that existing RAIDs include a single class of data disks henceforth called "primary". Accordingly, what is desired is a system and method to address the above-identified issues. The present invention addresses such a need.

SUMMARY OF THE INVENTION

The present invention provides for heterogeneous replication schemes, with plurality of classes of data disks and per-class pluggable data access mechanisms. The associated new capabilities include integrated support for Disaster Recovery (DR), quality of service (QoS), increased "life expectancy" for the flash memory based drives, and better data access performance.

In one aspect, a method for writing data to a data volume is disclosed. The method includes receiving a write operation to write a logical block of data to a heterogeneous data volume, the heterogeneous volume comprising a plurality of storage devices (disks); determining a number of copies of the logical block to store and associated classes of disks within the data volume to be used with each copy; determining replication schemes used in the data volume and associated with the specified classes of disks; processing the logical block in accordance with the replication schemes; selecting data writing mechanisms in accordance with the classes of disks and using those mechanisms to write the processed logical block to the data volume.

In a second aspect, a method for reading data from a data volume is disclosed. The method includes receiving read operation to read a logical block of data from a heterogeneous data volume, the heterogeneous data volume comprising plurality of storage devices (disks); determining disks within the data volume that store copies of the data blocks that comprise the logical block; determining classes of those disks and per-class data access mechanisms; executing one or more of those mechanisms to read data from the data volume.

A method and system in accordance with the present invention provides applications (such as filesystems, databases and search engines) to utilize faster, more expensive and possibly smaller in size disks for different types of data (e.g. database index), while at the same time leveraging existing, well-known and proven replications schemes (such as RAID-1, RAID-5, RAID-6, RAID-10, etc.). In addition, embodiments provide for integrated backup and disaster recovery, by integrating different types of disks, some of which may be remotely attached, in a single (heterogeneous) data volume.

To achieve these objectives, a system and method in accordance with the present invention can rely fully on existing art, as far as data caching, physical distribution of data blocks in accordance with the chosen replication schemes, prevention of a RAID vulnerability known as "write hole", techniques to prevent the "single point of failure" and optimize RAID array performance.

Other aspects of the invention will be apparent from the following description and the appended claims.

DETAILED DESCRIPTION OF THE INVENTION

Figure 1:
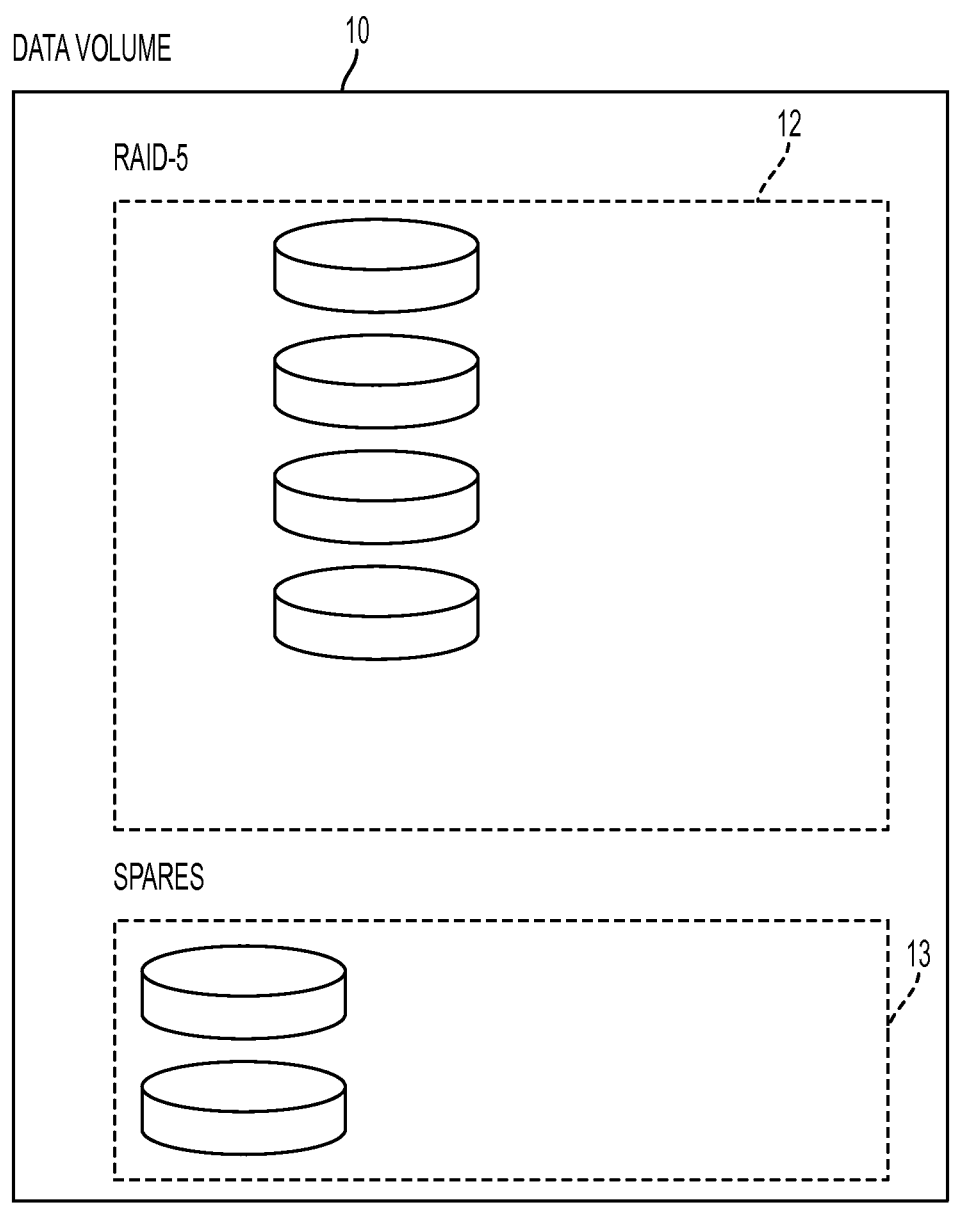
FIG. 1 illustrates a typical data volume with a single RAID-5 group including a plurality of 4 data disks.

In general, embodiments of the invention relate to a method and apparatus for replicating data. More specifically, embodiments of the invention relate to a method and apparatus for replication data using a modified RAID scheme. The following description is presented to enable one of ordinary skill in the art to make and use the invention and is provided in the context of a patent application and its requirements. Various modifications to the embodiments and the generic principles and features described herein will be readily apparent to those skilled in the art. The phrase "in one embodiment" in this specification does not necessarily refers to the same embodiment. Thus, the present invention is not intended to be limited to the embodiments shown, but is to be accorded the widest scope consistent with the principles and features described herein.

A data volume comprises a plurality of storage devices (disks) organized in one or more RAID groups. A write operation to write a logical block of data onto a data volume includes the following steps:
1. receiving a write operation to write a logical block of data to the data volume comprising plurality of storage devices (disks);
2. segmenting the logical block into data blocks and generate additional parity blocks, in accordance with replication schemes;
3. writing data blocks (typically, in stripes) onto the selected disks in the data volume.

A system and method in accordance with the present invention relies on substantial existing art to segment data into physical blocks and generate a proper number of parity blocks in accordance with replication schemes used in the data volume. The focus of a system and method in accordance with the present invention is the step 3 above, wherein as far as actual data writing is concerned, existing RAID solutions and products do not make any distinction between the disks within the RAID. A method and system in accordance with the present invention provides for the following modification of the aforementioned data writing sequence:
3a. determining classes of disks within the data volume to be used to store this logical block; selecting data writing mechanisms in accordance with pre-defined classes of those selected disks, and using those mechanisms to write the data and parity blocks to the data volume.

Said another way, from the perspective of writing data and parity blocks, existing RAIDs contain disks of the same class, which is henceforth called "primary". A system and method in accordance with the present invention provides for non-primary classes and per-class pluggable data writing mechanisms.

From the object model perspective, a data volume can be viewed as a container of groups of disks. Thus, there is a parent/child relationship: data volume=>group of disks governed by a certain replication scheme=>disk. A non-RAID (e.g., JBOD) based data volume can be abstracted as a simple container of disks: data volume=>contained disk. The writing and reading mechanisms can therefore be influenced by the up to 3 levels of management properties: the properties associated with the entire data volume, the properties of the contained group of disks (if available), and the properties of the disk itself.

A system and method in accordance with the present invention provides for the flexibility to fine-tune data writing and reading mechanisms used with a heterogeneous data volume on a per contained group of disks and per disk basis. For instance, a simple zero length encoding (ZLE) can be employed specifically when writing to flash memory drives (e.g., SSDs) within a given data volume, thus reducing the number of P/E cycles (and therefore increasing "life expectancy" of the drives) without adversely affecting overall I/O performance.

A system that utilizes the present invention can take the form of an implementation done entirely in hardware, entirely in software, or may be an implementation containing both hardware-based and software-based elements. In some embodiments, this disclosure may be implemented in software, which includes, but is not limited to, application software, firmware, resident software, program application code, microcode, etc.

Furthermore, the system and method of the present invention can take can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program or signals generated thereby for use by or in connection with the instruction execution system, apparatus, or device. Further a computer-readable medium includes the program instructions for performing the steps of the present invention. In one implementation, a computer-readable medium preferably carries a data processing or computer program product used in a processing apparatus which causes a computer to execute in accordance with the present invention. A software driver comprising instructions for execution of the present invention by one or more processing devices and stored on a computer-readable medium is also envisioned.

The medium can be an electronic, magnetic, optical, electromagnetic, infrared, or semiconductor system (or apparatus or device) or a propagation medium, or a signal tangibly embodied in a propagation medium at least temporarily stored in memory. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Specific embodiments are described below, with reference to the accompanying figures.

Figure 2:
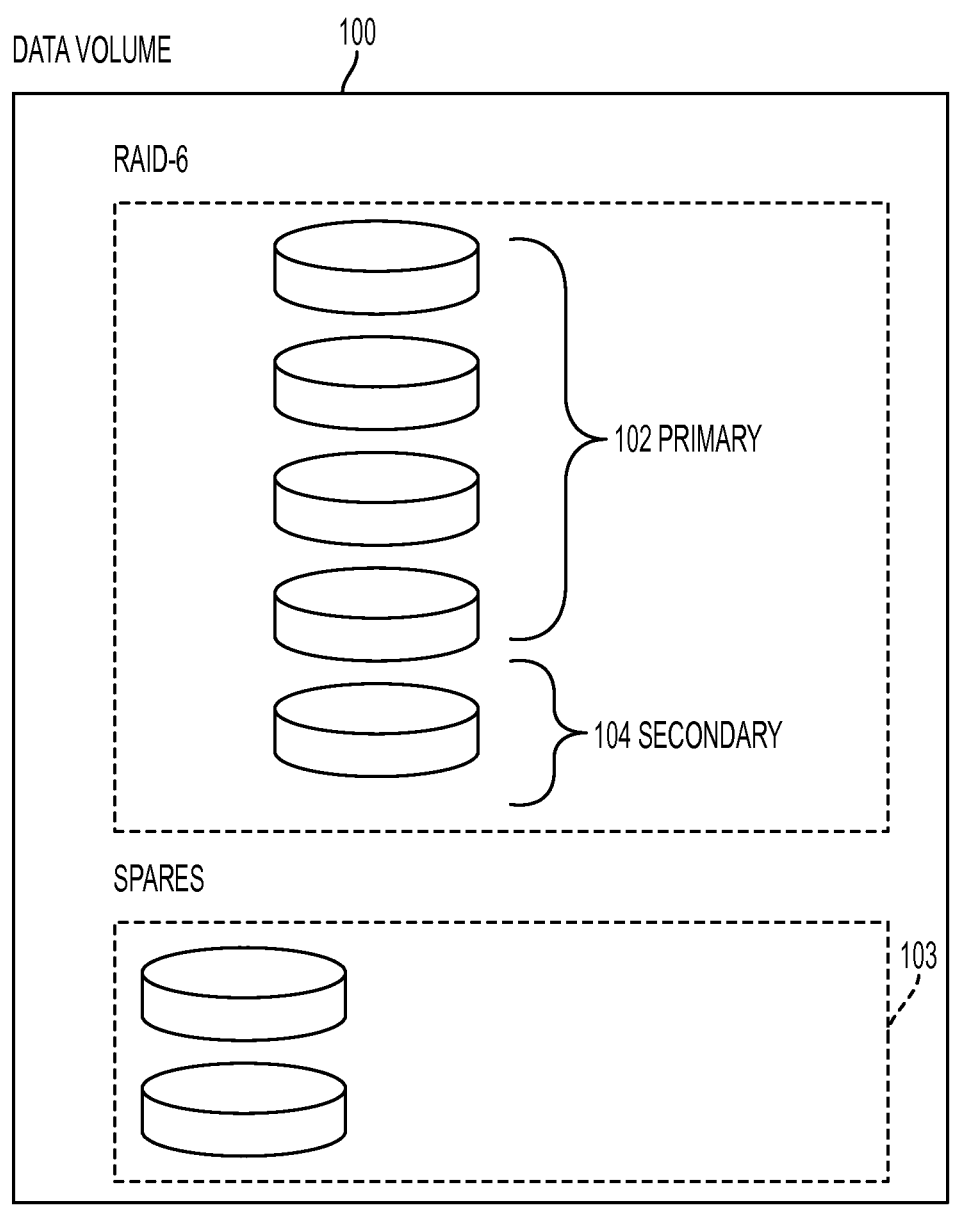
FIG. 2 illustrates a plurality of 4 primary and locally attached disks, and at least one "secondary" disk in a modified RAID-6 configuration.

FIG. 2 illustrates a plurality of four (4)primary and locally attached disks 102, spares 103 and at least one "secondary" disk 104 in a modified RAID-6 configuration. In this example, the disk 104 denoted as "secondary" could be remotely attached to the RAID group within the data volume 100 via iSCSI, FCoE, or any other compliant block storage interconnect. RAID-6 can withstand simultaneous failure of 2 disks, which provides for an associated benefit comparing to the RAID-5 shown in the FIG. 1.

Those skilled in the art will appreciate that using RAID-6 based on all locally attached (primary) disks 102 may appear to be either too expensive or not sufficiently reliable. Generally, fast and expensive storage such as FC drives, and in particular SSDs, comes with the motivation to look for alternative ways to protect against disk failures. Using local storage for parity or mirrored copies may simply be too expensive. In addition, local storage does not produce remotely available copies and therefore does not provide for disaster recovery (DR).

Figure 3:
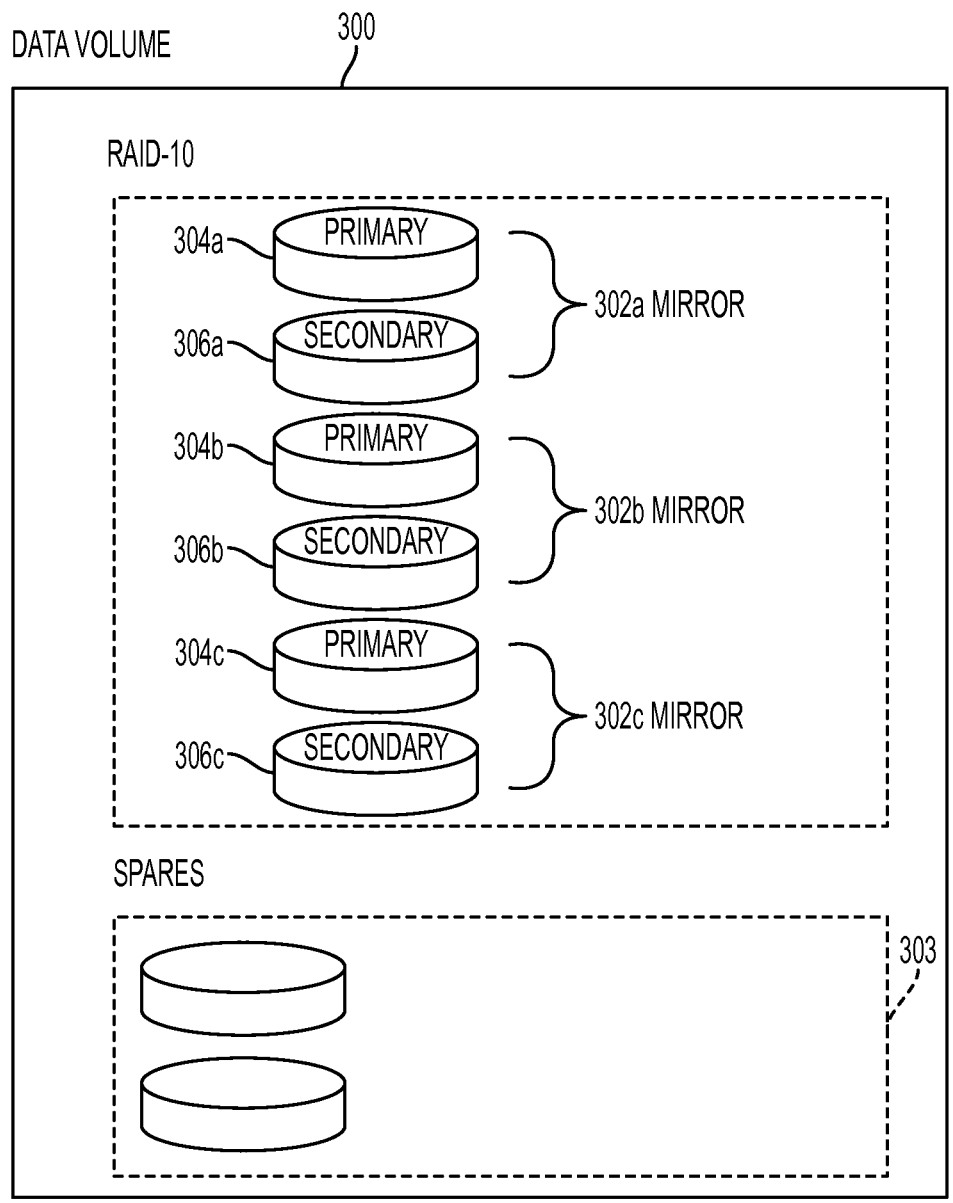
FIG. 3 illustrates a modified RAID 1+0 (also often called RAID-10) replication scheme.

FIG. 3 illustrates heterogeneous data volume 300 that uses RAID 1+0 (also often called RAID-10) replication scheme and having spares 303, in accordance with one embodiment of the invention. RAID 1+0 creates a striped set from two or more RAID-1 groups. RAID 1+0 can sustain multiple disk losses, as long as no mirror 302a, 302b, or 302c within the RAID loses all its disks. In one embodiment, a request to write a logical block to the data volume 300 is processed as follows. First, total number of data blocks required to store the logical block is determined. The data blocks are then allocated, thus in effect reserving the required storage on both primary and secondary disks 304a-c and 306a-c. Next, the logical block is striped uniformly across all primary disks 304a-c in the RAID, whereby each stripe includes 3 data blocks (one block per primary disk 304a-c). Simultaneously, each stripe is scheduled to be written to the secondary disks 306a-c, using the corresponding access method (for instance, iSCSI). Finally, I/O completion is reported back to the writing application.

This embodiment provides for remote copy of the data, comprising in this case a plurality of secondary disks 306a-306c. Those skilled in the art will appreciate that in this embodiment all writes to the secondary storage are performed asynchronously and therefore do not delay "fast" operation of the primary storage. Further, there are known techniques and substantial prior art to track pending writes, rather than logging those writes into a separate write log—when and if the amount of scheduled write operations exceeds amount of memory available for buffering of those operations.

The corresponding mechanism generally uses minimal control information to reference not yet transferred data blocks stored on the primary storage itself. For instance, StorEdge Network Data Replicator (SNDR) uses technique called "scoreboard logging" whereby a special bitmap tracks writes not yet committed to secondary storage. Similar techniques are implemented as part of Distributed Replicated Block Device (DRBD) software, and other solutions.

Unlike traditional RAID-5, RAID-6 and RAID 1+0 that stripe data and parity blocks uniformly across all data disks, a modified replication scheme in accordance with an embodiment takes into account classes of data disks and support per-class data access mechanisms. Generally, by combining fast (primary) storage and slow (secondary) storage within a given RAID group, a certain traditional simplicity of handling RAID replication logic is traded for advanced capabilities that include fully integrated and relatively inexpensive support for disaster recovery.

By combining fast (primary) storage and fastest (e.g., SSD based) storage within a given RAID group, a system and method in accordance with the present invention provides for overall improved I/O performance. For instance, in a heterogeneous data volume that includes SSDs, the latter can be used specifically to store database indexes, search engine indexes, filesystem metadata, and generally, and type of data that requires fastest access and reduced latencies. Often, this type of data includes application-specific control information, and as such does not require massive storage capacity.

One of ordinary skill in the art will appreciate that reduced I/O latency to access database index or a filesystem metadata will improve overall I/O performance of the database and the filesystem, respectively—even though the bulk of the data will still be stored on the traditional hard drives. Further, the flexibility to write only certain specified types of data onto flash memory drives can be combined with the flexibility to write the data differently—by taking into account properties (e.g., the choice of compression algorithm) associated with those drives within a heterogeneous data volume.

Figure 4:
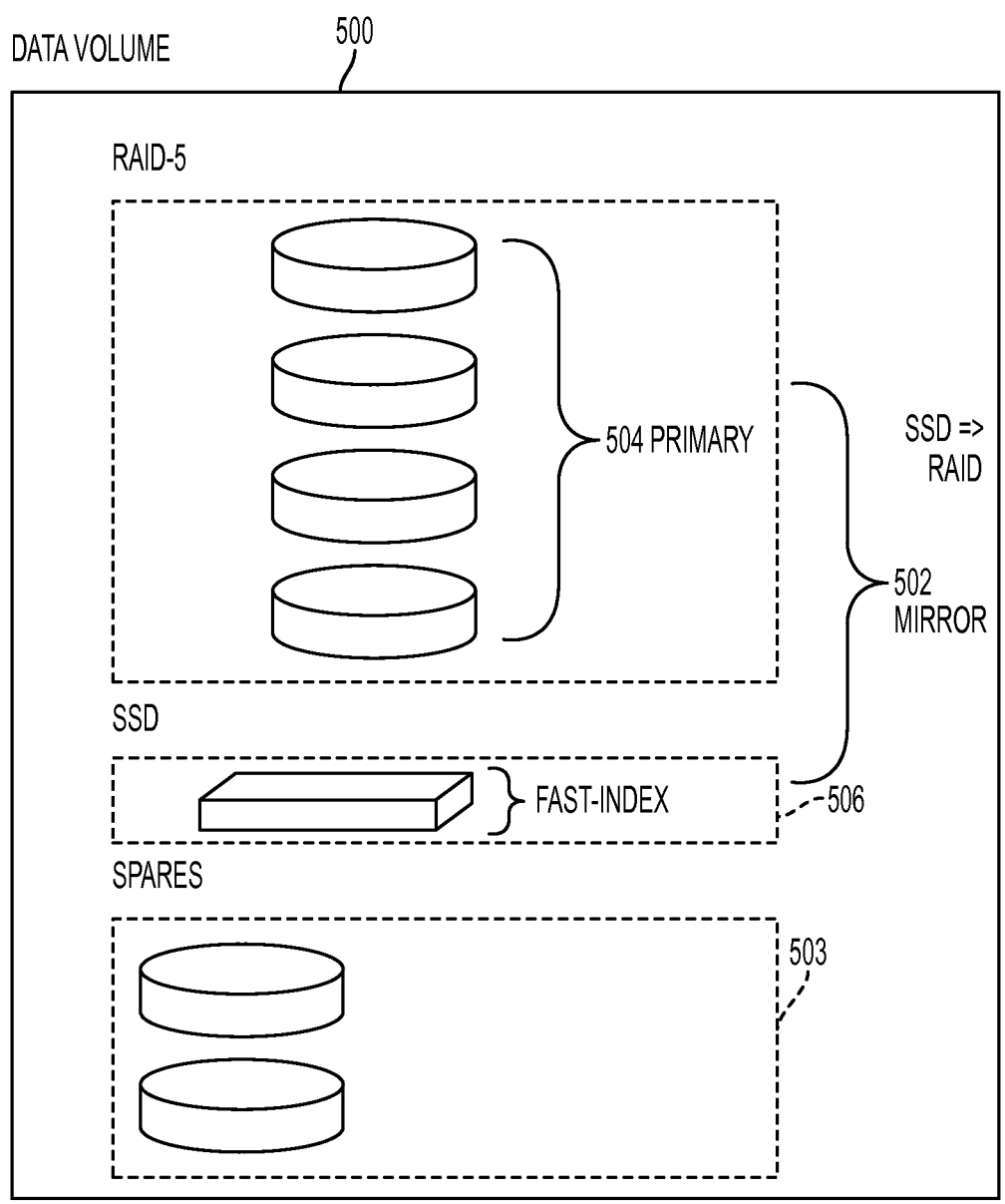
FIG. 4 illustrates data volume that contains a conventional RAID array including primary disks, and one or more SSD.

FIG. 4 illustrates data volume 500 that contains a conventional RAID array including a plurality of primary disks 504, spares 503 and one or more SSDs 506 in accordance with one embodiment. The SSD 506 in this case is assigned a separate disk class called "fast-index". Further, each logical block marked as "fast-index" by the writing application (e.g., a filesystem, database engine, or a search engine) is then written onto SSD 506 and mirrored 502 over onto primary disks 504 of the RAID array. Having an extra copy of the control information generally improves the fault tolerance and availability of the data volume, while storing indexes and control information on SSD 506 improves its overall I/O performance. In the embodiment, each logical block designated as "fast-index" is protected not only by its extra copy stored on the RAID array, but also by the replication scheme of the RAID array itself.

Further, each logical block written onto flash memory drives (such as SSD 506) can be compressed using any available lossless compression algorithm. The choices include multiple Lempel-Ziv variants, gzip variants, zero length encoding (ZLE) or run length encoding (RLE) or the like. In one embodiment, "fast-index" storage is associated with ZLE compression, thus providing for reduction of P/E cycles without adversely impacting on I/O performance.

In other embodiments, compression, encryption and other settings specific to the class of storage used in a heterogeneous data volume are applied based on the characteristics of the I/O workload, the type of stored data, capacity of the corresponding disks, and/or performance requirements.

In one embodiment, a request to write a logical block to the data volume 500 shown on FIG. 4 is processed as follows. First, a determination is made whether the logical block needs to be compressed, encrypted or otherwise processed in any way to satisfy the corresponding management properties associated with the data volume 500, its primary storage 504 or "fast-index" storage 506. For instance, "fast-index" storage 506 may be associated with a certain compression algorithm. If this is the case and if the logical block is marked as "fast-index", the block is first compressed.

Next, a total number of data blocks required to store the logical block on the RAID array is determined. The logical block is then divided into data blocks, and additional parity blocks generated in accordance with replication scheme used in the RAID array. If the logical block is marked as "fast-index", additional data blocks required to store a copy of the logical block on SSD 506 are determined. Subsequently, all the data blocks are allocated, thus reserving the required storage on both primary and fast-index disks 504 and 506. Finally, all data blocks are written using per-class data writing mechanisms, and I/O completion is reported back to the writing application.

Figure 5:
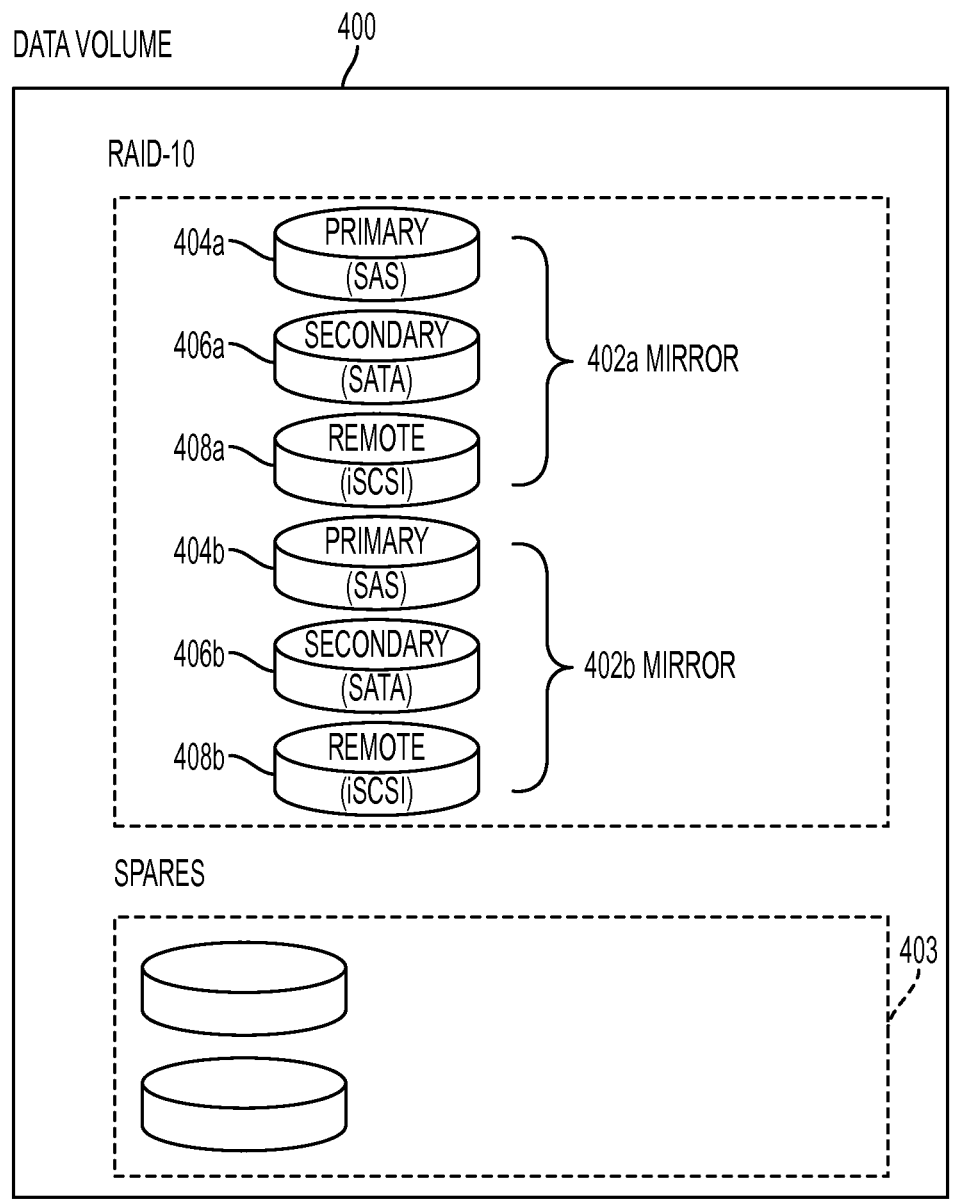
FIG. 5 illustrates data volume that contains RAID 1+0 array with a plurality of classes of storage.

As noted above, completion of the request to write a logical block to heterogeneous data volume is not necessarily synchronized with completions of the corresponding write operations. Those write operations are in turn specific to the disk classes used in the data volume. FIG. 5 illustrates data volume 400 that contains RAID 1+0 array, having mirrors 402a and 402b and spares 403, in accordance with one embodiment. The RAID array implements 3 classes of storage, with primary storage including of SAS drives 404a-b, secondary storage including SATA drives 406a-b, and the "remote" storage 408a-b attached via iSCSI. A request to write a logical block to the data volume (FIG. 5) entails determining the total number of data blocks and allocating those data blocks on the corresponding disks. Further, each stripe containing data blocks to be written to the data volume 400 can be called primary—if it includes data blocks to be stored on the SAS disks 404a-b, secondary—if the stripe includes data blocks to be stored on the SATA disks 406a-c, and respectively, "remote"—if the stripe includes data blocks to be stored on the iSCSI attached disks 408a-b.

In this embodiment, the following choices are therefore generally available:
- fully-synchronous write operation: primary, secondary and "remote" stripes are written, and the write operation does not proceed until all 3 writes are completed;
- alternatively, primary and secondary stripes can be written, while the "remote" stripe is scheduled to be written asynchronously;
- and finally, fully-asynchronous: primary stripe is written and the remaining two stripes are scheduled to be completed asynchronously.

In a heterogeneous data volume, I/O latencies and raw throughput vary and depend on (or rather, are defined by) the classes of included disks. To support all possible deployment scenarios and IT policies, preferred embodiments provide for configurable write synchronization, with the levels of synchronization ranging from fully-synchronous (which is identical to the conventional RAID operation), to fully asynchronous, as described above.

In comparison with existing solutions tailored specifically to replicate disks over IP network, a system and method in accordance with present invention provides for RAID-integrated functionality not only to replicate the disks (in accordance with a variety of supported replication schemes), but also to recover from disk failures, to replace existing disks, to reconstruct disks within RAID based on the contents of its other disks.

Conventional disk-level replication solutions and products, including the aforementioned Distributed Replicated Block Device (DRBD) and StorEdge Network Data Replicator (SNDR), use custom client/server protocols to replicate selected disks over IP network. A system and method in accordance with the present invention, on the other hand, relies on existing RAID logic layered on top of standard block level protocols that transport SCSI commands and responses between any compliant storage initiators and targets. This layering and reliance on standard SAN protocols is what in turn provides embodiments of this invention with disk replacement, fault tolerance, volume recovery in presence of disk failures, and other important functions that are generally expected from RAID arrays. For instance, it is generally expected that RAID supports the capability to reconstruct a failed disk to a replacement disk—the function that is generally not available with custom client/server based disk replications. In that latter sense, integrated remote disk mirroring is just an additional function available with heterogeneous data volumes described herein.

Embodiments provide advanced capabilities, by combining storage of different classes within a heterogeneous data volume. Each class provides for its (per-class) I/O latency; therefore the associated tradeoff can be summarized as additional logic and/or computing resources (e.g., additional RAM) required to handle differences in the I/O latencies within a given heterogeneous data volume. To handle associated corner cases, the embodiments rely both on the techniques available with standalone disk replication solutions (e.g., the aforementioned "scoreboard logging"), as well as the RAID's own capability to rebuild (recreate, resolver) some of the disks based on the redundant content stored on the other disks in the data volume.

Further, embodiments of the present invention allow leveraging different existing drive technologies without compromising on limitations associated with each specific technology. As noted above, the 3-level parent/child relationship between heterogeneous data volume and its disks provides for the flexibility to fine-tune and optimize data writing and reading mechanisms on a per RAID group and per disk basis. A commonly used approach to manage parent/child hierarchies defines the corresponding management properties as "recursive", or recursively inherited. This allows the child to inherit a given management property from its parent, and optionally override it on its own (the child's) level, if required. Lossless data compression would be an example of such management property that can be used only with certain classes of disks within a heterogeneous data volume.

Embodiments of the present invention provide for specifying compression on the level of the entire data volume, group of disks governed by a certain replication scheme, or a single drive. Those skilled in the art will appreciate that, for instance, zero length encoding employed with flash memory drives (e.g., SSDs) will reduce the number of P/E cycles without adversely affecting overall I/O performance of the data volume.

Figure 6:
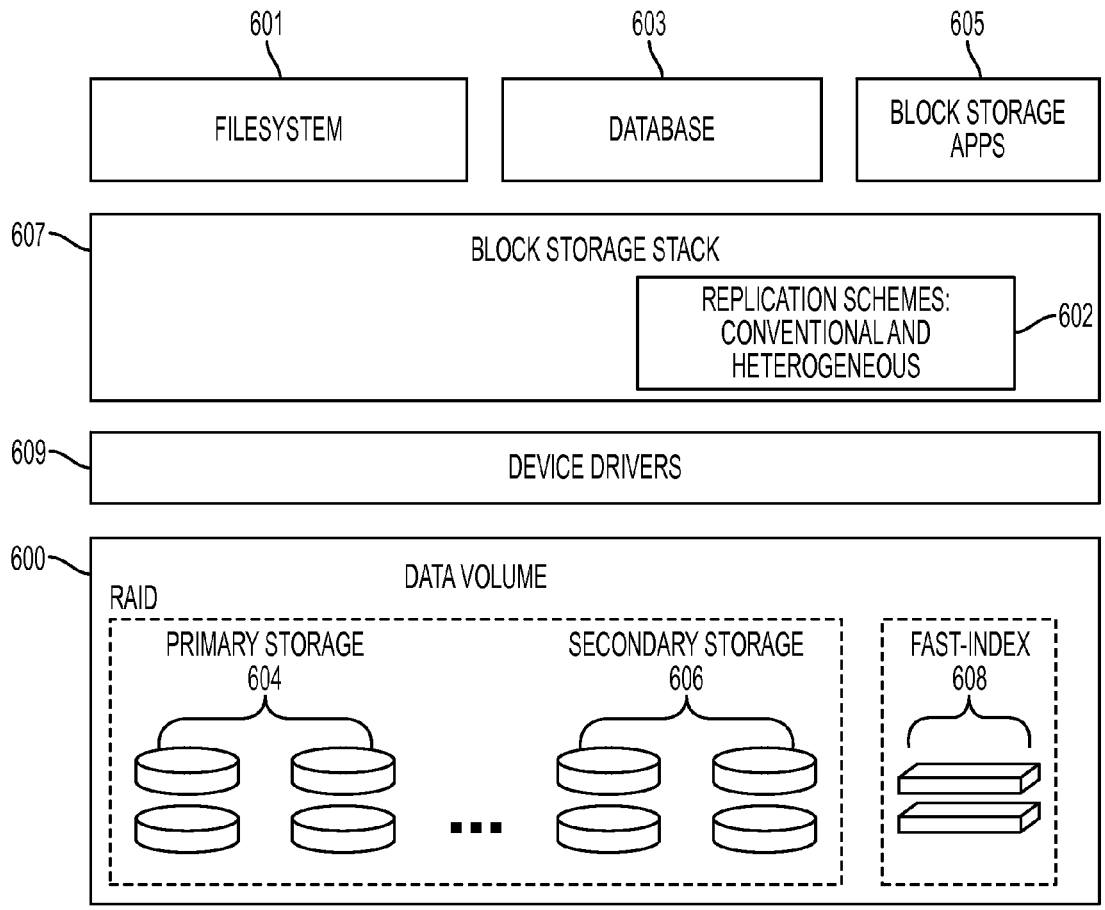
FIG. 6 and FIG. 7 illustrate system architectures, in accordance with embodiments of the present invention.
Figure 7:
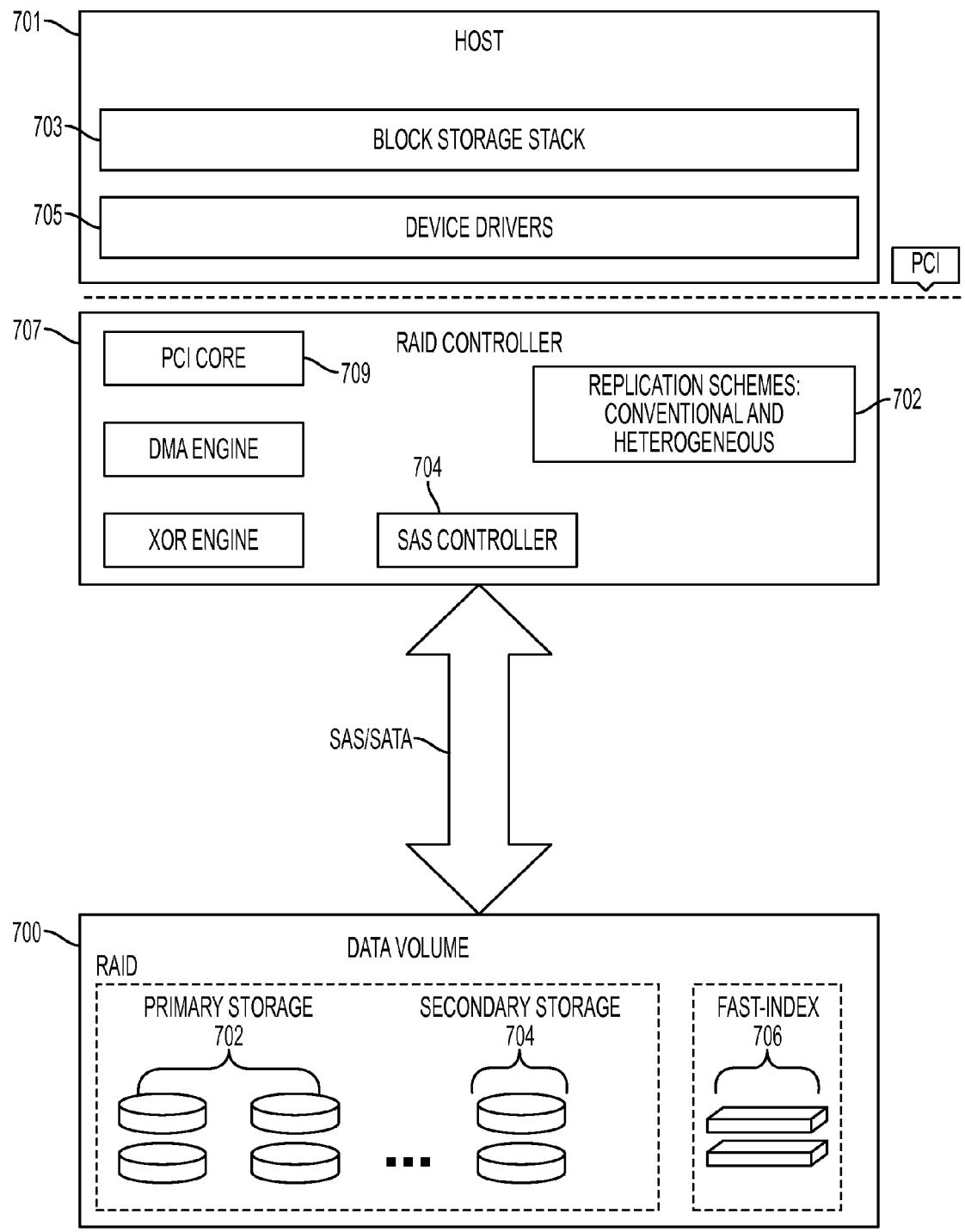

FIG. 6 and FIG. 7 illustrate system architectures, in accordance with embodiments of the present invention. The system architecture shown on FIG. 6 includes a filesystem 601, database engine 603, device drivers 609 and other block storage applications 605 interacting with a block storage stack 607. The storage stack 607 in turn includes RAID software 602 that provides for conventional RAID schemes, as well as replication schemes enhanced in accordance with the present invention. The storage stack 607 uses device drivers to control storage inter-connects (SAS, SATA, FC, FCoE, iSCSI, USB, etc.) and interface with a data volume 600 that combines plurality of storage devices (disks) 604-608 organized in a variety of replication schemes. The present invention provides for heterogeneous replication schemes, with plurality of classes of data disks and per-class pluggable data access mechanisms. In one embodiment, the data volume includes a RAID group comprising primary storage 604 and secondary storage 606 (e.g., attached via iSCSI). In addition to the RAID, the data volume includes fast-index storage 608 (e.g., SSDs). The corresponding disk classes are, respectively, primary, secondary, and fast-index (FIG. 6).

In general, all major general purpose operating systems already include support for so called "software RAID"—a software layer 602 that sits above disk device drivers (as shown on FIG. 6) and provides for certain replication schemes, typically including RAID-0, RAID-1, and RAID-5. A system and method in accordance with the present invention provides for "software RAID" enhancements, to support heterogeneous arrays with advanced features discussed above. The corresponding embodiments will reuse iSCSI and FC stacks that are also currently available with all major operating systems.

FIG. 7 shows an alternative system architecture, in accordance with another embodiment in accordance with the present invention. The system architecture includes a host 701, replication schemes: conventional and heterogeneous 702, SAS controller 704, device drivers 705, fast index 706, a RAID controller 707, and a data volume 700 connected to the latter. The host 701 in turn includes block storage applications (e.g., filesystems and databases) interacting with a block storage stack 703 that uses device drivers to interface with a RAID controller 707. The RAID controller 707 includes modules that provide for PCI and other functions 709, as well as RAID logic that supports conventional RAID schemes and heterogeneous replication schemes in accordance with the present invention. The RAID controller 707 interfaces with the data volume 700 via SAS, SATA, FC, FCoE, iSCSI and other compliant storage inter-connects managed by the corresponding modules (for instance, SAS controller 704 shown on the figure) within the RAID controller 707 itself. The SAS controller 704 will provide attachment to SAS and SATA drives; more than a single type of transport controller can be added to provide for multiple I/O access mechanisms.

Figure 8:
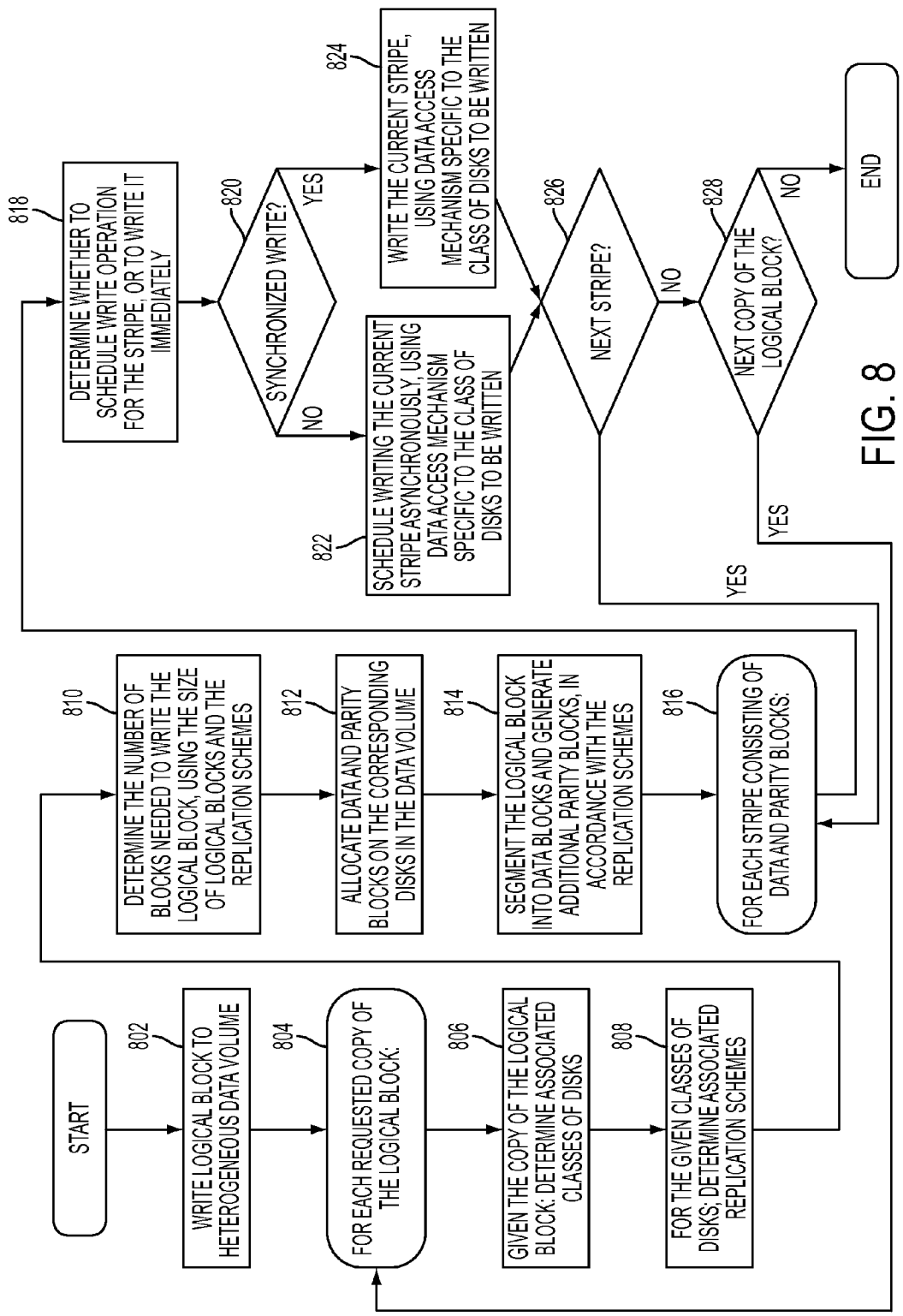
FIG. 8 shows a flow chart for writing a logical block to a heterogeneous data volume.

FIG. 8 shows a flow chart for writing a logical block to a heterogeneous data volume in accordance with one embodiment. Initially, a request to write a given number of copies of the logical block to the heterogeneous data volume is received, via step 802. For each requested copy, via step 804, the application may specify preferred or required classes of disks to be used to store the logical block on the heterogeneous data volume, via step 806. For example, the first copy of the logical block may be associated with a fast-index class (FIG. 4, FIG. 6, and FIG. 7). Thus, embodiments of the present invention provide for applications (including filesystems and database servers) to store certain types of information on solid state drives, while other types of information on less expensive and/or remotely attached storage.

Given the copy of the logical block and classes of disks associated with this copy, determination is then made regarding operations to be performed on the logical block prior to segmenting it into data blocks (e.g., compression), and replication schemes to be used to store the logical block, via step 808. Two specific examples follow below.

FIG. 4 illustrates a data volume 500 that contains a conventional RAID array including primary disks, and one or more SSDs in accordance with one embodiment. The SSDs 506 in this case are assigned a separate disk class called "fast-index", with its own per-class management properties (e.g., compression, encryption). The primary storage 504 of FIG. 4 is managed by the conventional RAID-5.

The second example is illustrated by FIG. 5, whereby a data volume 400 contains RAID 1+0 array in accordance with another embodiment of the invention. The RAID array of FIG. 5 implements 3 classes of storage. The writing application in this case will be able to specify the preferred disk class for a given copy of the logical block; otherwise, if no preferences are specified, the logical block is stored in accordance with the RAID 1+0 replication scheme.

Further, the FIG. 8 flow chart illustrates steps to segment the logical block into data blocks and generate parity blocks. The number of blocks required to write the logical block (that may be previously compressed, encrypted or otherwise processed as described above) is determined, via step 810, using the size of logical blocks and the selected replication schemes (above). The required number of data and parity blocks is then allocated on the corresponding disks in the data volume, via step 812. The logical block is segmented into data blocks and additional parity blocks generated, in accordance with the selected replication schemes, via step 814.

Continuing with the discussion of FIG. 8, for each stripe including data and parity blocks, via step 816, determination is made whether to schedule write operation for the stripe, or to write it immediately using data access mechanism specific to the class of disks to be written, via step 818. Once the stripe is written or scheduled to be written, the execution proceeds to process the next stripe, via step 820-826 and repeats the steps described above. Once the entire logical block is written, the execution proceeds to the next copy of the logical block, if available, via step 828.

Those skilled in the art will appreciate that the way data is written to heterogeneous data volume presents new capabilities, as far as data reading is concerned. For instance, if a copy of a certain logical block is stored on read optimized disks denoted as fast-index (FIG. 4, FIG. 6, and FIG. 7) as well as on the other disks that have higher read latencies, the application may decide to use the former for reading. On the other hand, policies and Quality of Service (QoS) control mechanisms in accordance with existing art can be implemented, to restrict access to the fast storage taking into account type of the application and other criteria.

Figure 9:
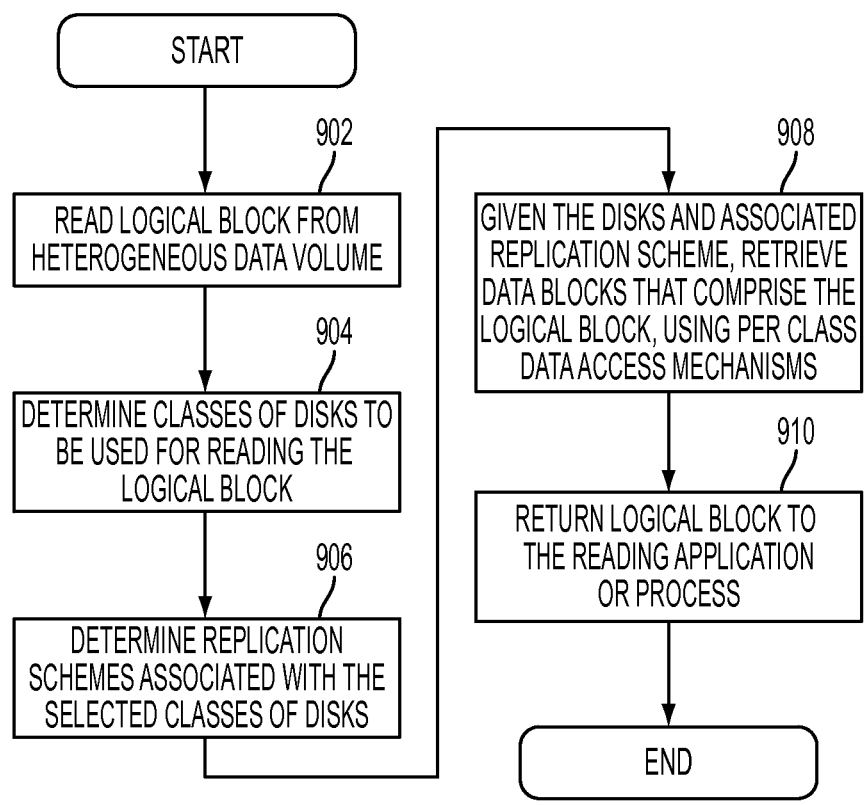
FIG. 9 shows a flow chart for reading a logical block from a heterogeneous data volume.

FIG. 9 shows a flow chart for reading a logical block from a heterogeneous data volume in accordance with one embodiment of the invention. Initially, a request to read logical block is received, via step 902. Location, or locations (in case of multiple stored copies) of the logical block is then determined. Each stored copy of the logical block is associated with classes of disks (that store this copy).

In presence of multiple copies, the reading application may specify preferred or required classes of disks to be used to read the data. The classes of disks to be used for reading this logical block are then determined, via step 904. Based on those classes, associated replication schemes are determined, via step 906. Subsequently, given the classes of disks and the replications schemes, the execution proceeds to retrieve all data blocks that comprise the requested logical block, via step 908. Per disk class access mechanisms (e.g., SAS, iSCSI, etc.) are used to perform the actual reading. Finally, the logical block is returned back to the reader, via step 910.

The read and write logic described herein may be implemented in the software, firmware, hardware, or any combination of the above. A method and system in accordance with the present invention provides applications (such as filesystems, databases and search engines) to utilize faster, more expensive and possibly smaller in size disks for different types of data (e.g. database index), while at the same time leveraging existing, well-known and proven replications schemes (such as RAID-1, RAID-5, RAID-6, RAID-10, etc.). In addition, embodiments provide for integrated backup and disaster recovery, by integrating different types of disks, some of which may be remotely attached, in a single (heterogeneous) data volume.

The present invention is not intended to be limited to the embodiments shown, but is to be accorded the widest scope consistent with the principles and features described herein. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for writing data to a heterogeneous data volume, the method comprising:
  receiving a write operation to write a logical block of data to the heterogeneous data volume; and
  in response to the write operation to the heterogeneous data volume:
    determining a number of copies of the logical block to store;
    determining associated classes of disks within the data volume to be used with each copy;
    processing each copy of the logical block in accordance with management properties associated with its determined class of disks;
    determining replication schemes used in the data volume and associated with the determined classes of disks;
    processing the logical block in accordance with the replication schemes;
    selecting data writing mechanisms in accordance with each of the classes of disks,
  wherein selecting data writing mechanisms comprise, for each logical block, determining, in accordance with each of the classes of disks, whether to schedule a write operation for the logical block or write it immediately; and
    using the selected data writing mechanisms to perform at least one of:
      writing the copies of the processed logical block to their associated classes of disks within the data volume, wherein each of the classes of disks includes a plurality of storage devices within the data volume, and
      scheduling the copies of the processed logical block to be written to their associated classes of disks within the data volume.

2. The method of claim 1, wherein the processing of logical blocks includes segmenting the logical block into data blocks and generating additional parity blocks in accordance with the replication schemes.

3. The method of claim 2, wherein the data and parity blocks are written to the data volume using data writing mechanisms in accordance with the determined classes of disks.

4. The method of claim 1, further comprising allowing writing applications to specify a preferred or required class of disks to be used with each copy of the logical block being stored on the heterogeneous data volume.

5. The method of claim 4, wherein the writing applications comprise one or more of file systems, database servers, search engines, and block storage applications.

6. The method of claim 1, wherein processing each copy of the logical block comprises determining classes of disks of the heterogeneous data volume that match the class of disk associated with a respective copy of the logical block.

7. The method of claim 1, wherein at least two distinct classes of the classes of disks comprise at least one non-primary class.

8. The method of claim 1, wherein the per-class access mechanisms are based at least in part on management properties that comprise one or more of a data compression scheme, data encryption scheme, and whether the write operation is synchronous or asynchronous.

9. The method of claim 1, wherein at least one data writing mechanism comprises: a fully-synchronous write operation, a semi-synchronous write operation and a fully-asynchronous write operation.

10. A non-transitory computer readable storage medium containing program instructions executable on a computer, for writing data to a heterogeneous data volume, wherein the computer performs the following functions:
  receiving a write operation to write a logical block of data to the heterogeneous data volume; and
  in response to the write operation to the heterogeneous data volume:
    determining a number of copies of the logical block to store;
    determining associated classes of disks within the data volume to be used with each copy;
    processing each copy of the logical block in accordance with management properties associated with its corresponding class of disks;
    determining replication schemes used in the data volume and associated with the determined classes of disks;
    processing the logical block in accordance with the replication schemes;
    selecting data writing mechanisms in accordance with each of the classes of disks,
  wherein selecting data writing mechanisms comprise, for each logical block, determining, in accordance with each of the classes of disks, whether to schedule write operation for the logical block or write it immediately; and
    using the selected data writing mechanisms to perform at least one of:
      writing the copies of the processed logical block to their associated classes of disks within the data volume, wherein each of the classes of disks includes a plurality of storage devices within the data volume, and scheduling the copies of the processed logical block to be written to their associated classes of disks within the data volume.

11. The computer readable medium of claim 10, wherein the processing of logical blocks includes segmenting the logical block into data blocks and generating additional parity blocks in accordance with the replication schemes.

12. The computer readable medium of claim 11, wherein the data and parity blocks are written to the data volume using data writing mechanisms in accordance with the determined classes of disks.

13. The computer readable storage medium of claim 10, wherein at least two distinct classes of the classes of disks comprise at least one non-primary class.

14. The computer readable storage medium of claim 10, wherein the per-class access mechanisms are based at least in part on management properties that comprise one or more of a data compression scheme, data encryption scheme, and whether the write operation is synchronous or asynchronous.

15. The computer readable medium of claim 10, wherein at least one data writing mechanism comprises: a fully-synchronous write operation, a semi-synchronous write operation and a fully-asynchronous write operation.

16. A system, comprising:
a processor;
a heterogeneous data volume; and
a computer readable medium comprising programmable instructions for writing data to a data volume that, when executed by the processor, is configured to perform a method, the method comprising:
receiving a write operation to write a logical block of data to the heterogeneous data volume; and
in response to the write operation to the heterogeneous data volume:
determining a number of copies of the logical block to store;
determining associated classes of disks within the data volume to be used with each copy;
processing each copy of the logical block in accordance with management properties associated with its corresponding class of disks;
determining replication schemes used in the data volume and associated with the determined at least two distinct classes of disks;
processing the logical block in accordance with the replication schemes;
selecting data writing mechanisms in accordance with each of the classes of disks,
wherein selecting data writing mechanisms comprise, for each logical block, determining, in accordance with each of the classes of disks, whether to schedule write operation for the logical block or write it immediately; and
using the selected data writing mechanisms to perform at least one of:
writing the copies of the processed logical block to their associated classes of disks within the data volume, wherein each of the classes of disks includes a plurality of storage devices within the data volume, and
scheduling the copies of the processed logical block to be written to their associated classes of disks within the data volume.

17. The system of claim 16, wherein the processing of logical blocks includes segmenting the logical block into data blocks and generating additional parity blocks in accordance with the replication schemes.

18. The system of claim 17, wherein the data and parity blocks are written to the data volume using data writing mechanisms in accordance with the determined classes of disks.

19. The system of claim 16, wherein at least two distinct classes of the classes of disks comprise at least one non-primary class.

20. The system of claim 16, wherein the per-class access mechanisms are based at least in part on management properties that comprise one or more of a data compression scheme, data encryption scheme, and whether the write operation is synchronous or asynchronous.

21. The system of claim 16, wherein at least one data writing mechanism comprises: a fully-synchronous write operation, a semi-synchronous write operation and a fully-asynchronous write operation.

* * * * *